US008066608B2

(12) United States Patent
Sugiura et al.

(10) Patent No.: US 8,066,608 B2
(45) Date of Patent: Nov. 29, 2011

(54) AUTOMATIC TRANSMISSION

(75) Inventors: Nobutada Sugiura, Anjo (JP); Minoru Todo, Takahama (JP); Mikio Iwase, Anjo (JP); Takuya Ishii, Anjo (JP); Tomohiro Katada, Anjo (JP); Hirofumi Ota, Toyota (JP); Kazutoshi Nozaki, Togo-cho (JP); Atsushi Honda, Seto (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 771 days.

(21) Appl. No.: 12/083,717

(22) PCT Filed: Nov. 8, 2006

(86) PCT No.: PCT/JP2006/322249
§ 371 (c)(1),
(2), (4) Date: Aug. 19, 2008

(87) PCT Pub. No.: WO2007/063684
PCT Pub. Date: Jun. 7, 2007

(65) Prior Publication Data
US 2009/0139370 A1  Jun. 4, 2009

(30) Foreign Application Priority Data

Nov. 29, 2005  (JP) .................................. 2005-344760

(51) Int. Cl.
*F16H 3/44* (2006.01)
*F16H 57/02* (2006.01)
(52) U.S. Cl. ...................................... 475/271; 74/606 R

(58) Field of Classification Search .................. 475/269, 475/271–291, 296, 331, 346; 74/606 R; 384/626, 609, 616
See application file for complete search history.

(56) References Cited

U.S. PATENT DOCUMENTS

| 4,940,446 | A | 7/1990 | Inui et al. |
| 6,478,132 | B1 | 11/2002 | Inaba |
| 7,384,366 | B2 * | 6/2008 | Kelley, Jr. .................. 475/296 |
| 7,543,520 | B2 * | 6/2009 | Stevenson et al. .......... 74/606 R |
| 2004/0121878 | A1 | 6/2004 | Tanikawa |

(Continued)

FOREIGN PATENT DOCUMENTS

DE    102 30 861 A1    1/2004
(Continued)

OTHER PUBLICATIONS

Supplementary European Search Report completed Mar. 9, 2011 in European Application No. EP 06 82 3153.

*Primary Examiner* — Roger Pang
(74) *Attorney, Agent, or Firm* — Oliff & Berridge, PLC

(57) ABSTRACT

An automatic transmission includes a case; a speed change mechanism; a torque converter having a lock-up clutch axially arranged and freely slidably toward and away from the input shaft; a thrust bearing interposed between the flange unit and the side face of the sleeve unit on the input shaft side; a ball bearing that includes an outer race, a side face of which contacts the first step portion toward the input shaft side, and a propeller shaft connecting member capable of connecting with a propeller shaft, spline-engaging with the outer periphery of the output shaft, and contacting a side face of an inner race of the ball bearing upon being pressed axially toward the input shaft side by the propeller shaft.

14 Claims, 3 Drawing Sheets

U.S. PATENT DOCUMENTS

| | | | |
|---|---|---|---|
| 2005/0187062 A1* | 8/2005 | Joki et al. | 475/230 |
| 2006/0160651 A1* | 7/2006 | Petruska et al. | 475/246 |
| 2008/0264202 A1* | 10/2008 | Mineshima | 74/606 R |

FOREIGN PATENT DOCUMENTS

| | | |
|---|---|---|
| JP | A-61-52447 | 3/1986 |
| JP | A 63-083461 | 4/1988 |
| JP | A-02-278064 | 11/1990 |
| JP | A 02-296058 | 12/1990 |
| JP | 08261311 A * | 10/1996 |
| JP | A-2001-27310 | 1/2001 |
| JP | A-2001-116120 | 4/2001 |
| JP | A-2003-254412 | 9/2003 |
| JP | A-2004-116625 | 4/2004 |
| JP | A-2005-113974 | 4/2005 |

* cited by examiner

AUTOMATIC TRANSMISSION

INCORPORATION BY REFERENCE

This application is the U.S. National Stage of PCT/JP2006/322249, filed Nov. 8, 2006, which claims priority from JP2005-344760, filed Nov. 29, 2005, the disclosures of which are incorporated herein in their entireties by reference.

BACKGROUND

The present invention relates to an automatic transmission.

There exists an automatic transmission that is mounted in a vehicle such as a front engine rear drive (FR) type. A torque converter is coaxially arranged between an output shaft (a crankshaft) of the engine and a propeller shaft transmitting a rotation to the rear wheels in the vehicle. The torque converter is connected to the output shaft of the engine, and to a speed change mechanism that shifts a rotation of the torque converter and transmits the rotation to the propeller shaft.

In the speed change mechanism, the input shaft and the output shaft are rotatably fitted directly or via an intermediate shaft. A single-shaft aligned center axis is structured by the shaft in a both-end support state by a case, a gear mechanism including rotary members such as each gear of the planetary gears, a hub member connecting these gears, a sleeve member, a (clutch) drum member, and the like. In addition, among these rotary members, rotary members, except for what are fixed on the center axis (the input shaft, the intermediate shaft, and the output shaft), are rotatably supported on the center axis by a sleeve or a needle bearing and the like and are also supported in the axial direction by a thrust bearing and the like interposed among each rotary member.

By the way, the propeller shaft generates torsion because a rotational torque acts when it transmits a driving rotation. The changes of torsion magnitude by torque variation cause expansion and contraction. Therefore, for example, a pressing force and a tensile force are applied to the output shaft fixed in the propeller shaft via a flange yoke and the like from the axially rear side. In particular, when the output shaft is pressed from the rear side and moves to the front side, there is a possibility that the input shaft moves via a thrust bearing and the like interposed among the rotary members. The torque converter provided with a lock-up clutch is affected on the axial position of the lock-up clutch. Therefore, it is possible for a slip to occur at the time of non-engagement, and controllability in an engagement control (a slip control) is adversely affected.

Therefore, there has been proposed a ball bearing that rotatably supports the output shaft in the axial direction (see, for example, German Patent Application Laid-Open No. 10230861 (DE10230861A1)). This positions and fixes an outer race of the ball bearing for the case, pinches an inner race of the ball bearing by a flange yoke for the output shaft by fastening a backward nut, and also positions and supports the axial position of the output shaft by the ball bearing.

SUMMARY

Because the structure that positions and supports the axial position of the output shaft via the ball bearing receives a force from both directions of the axis, there is the possibility that a force will be frequently received and that the durability may deteriorate. In addition, when the durability and the like are considered, increasing the capacity of a receiving force is necessary. This leads to an enlargement of a ball bearing, and thus prevents the automatic transmission from being compact.

Furthermore, unless the inner face of the ball bearing, the output shaft, and the flange yoke are precisely positioned for assembly, under the rotational state where no force in the axial direction is generated to the output shaft, a ball rotating in a single-side contact state could have an adverse effect on durability.

In addition, it is necessary to make the thickness of a washer interposed between the inner race and the step portion of the output shaft (that is, the front side of the ball bearing) accurate to avoid such a single-side contact. However, product size deviations are incurred in the shape of the output shaft, the ball bearing, and the case. Therefore, in an assembled state, measuring an empty space between the inner race and the step portion of the output shaft becomes necessary. Of course, there is a problem in that the measurement is not made easy because attaching the ball bearing blocks the measurement. Furthermore, even when the empty space is precisely measured, after the measurement, the ball bearing is detached and again assembled while interposing a washer. This increases the production process.

Therefore, the present invention provides an automatic transmission capable of enhancing the durability and compactness of a ball bearing, while supporting an axial position of an output shaft with high accuracy. The present invention can also achieve various other advantages.

An exemplary aspect of the invention includes an automatic transmission with a case; a speed change mechanism including an input shaft and an output shaft, the input shaft and the output shaft being rotatably supported by the case and forming a single-shaft aligned along a center axis, with the speed change mechanism also including a gear mechanism on the center axis; a torque converter having a lock-up clutch axially arranged and freely slidably toward and away from the input shaft, wherein: the case includes a sleeve unit at an outer periphery of the output shaft, the output shaft includes a flange unit arranged opposite a side face of the sleeve unit on an input shaft side, and the sleeve unit has a first step portion at an inner periphery thereof; a thrust bearing interposed between the flange unit and the side face of the sleeve unit on the input shaft side; a ball bearing that includes an outer race, a side face of which contacts the first step portion toward the input shaft side, with the ball bearing interposed between the inner periphery of the sleeve unit and the outer periphery of the output shaft; and a propeller shaft connecting member capable of connecting with a propeller shaft, spline-engaging with the outer periphery of the output shaft, and contacting a side face of an inner race of the ball bearing upon being pressed axially toward the input shaft side by the propeller shaft.

BRIEF DESCRIPTION OF THE DRAWINGS

Various exemplary embodiments of the invention will be described with reference to the drawings, wherein.

DETAILED DESCRIPTION OF PREFERRED EMBODIMENTS

Figure 1:
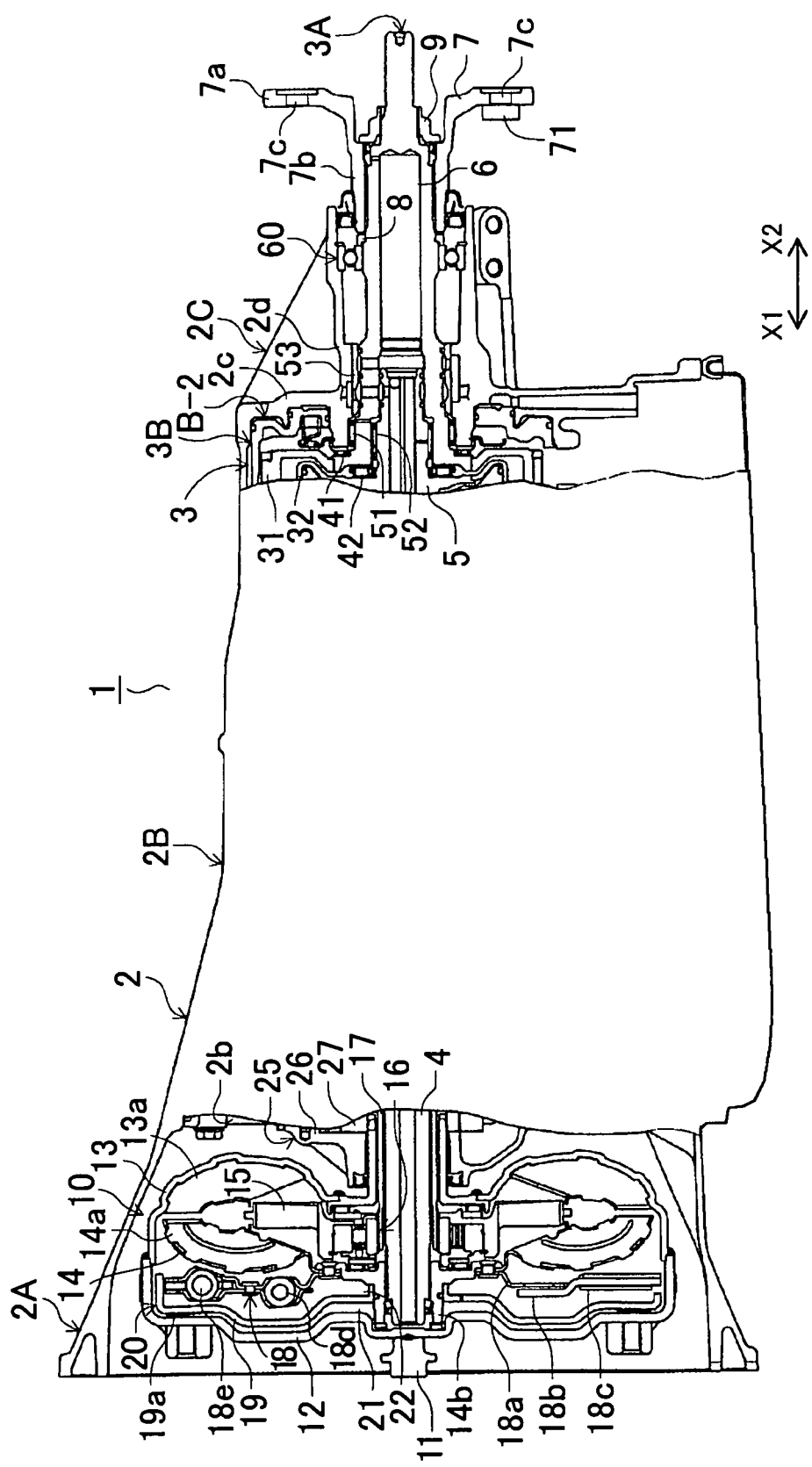
FIG. 1 is a partially abbreviated cross section view of an automatic transmission according to the present invention.

An embodiment of the present invention will be described below according to FIGS. 1 to 3. An automatic transmission shown in FIG. 1 according to the present invention is preferably used for a vehicle of the FR type. In FIG. 1, the left side indicated by X1 is the front side for the vehicle, and, the right side indicated by X2 is the rear side. Therefore the left in the figure is referred as the "front side," and the right side is referred as the "rear side."

As shown in FIG. 1, an automatic transmission 1 according to the present invention is preferably used for a vehicle of the FR type. Roughly from the front side to the rear side, the automatic transmission 1 includes a torque converter 10 having a lock-up clutch 20, and a speed change mechanism 3 in an integrated case (simply referred to as a "case," hereinafter) 2 having a housing case unit 2A, a transmission case unit 2B, and an end case 2C. The torque converter 10 is included in the housing case unit 2A (and an engine case), and the speed change mechanism 3 is included in the transmission case unit 2B, with a partition wall member 2b fixed in a portion on the front side of the transmission case unit 2B, and a partition unit 2c at the rear side.

The torque converter 10 is housed in the housing case unit 2A, and is arranged on the input shaft 4 of the speed change mechanism 3, which is described in detail below, and is interposed between an input shaft 11 that connects the automatic transmission 1 with an output shaft (a crankshaft) of the engine, not shown, and the input shaft 4 of the speed change mechanism 3 as a transmission path. In addition, the torque converter 10 has a front cover 12 and a rear cover 13 that are integrally coupled by welding or the like. The front cover 12 is connected to the output shaft of the engine via the input shaft 11.

As for the rear cover 13, its outside diameter forms an outer contour of a pump impeller 13a and the inner diameter end is connected to a drive gear 27 stored in a pump body 26 of an oil pump 25 arranged on the inner periphery of the partition wall member 2b.

On the front side of the pump impeller 13a, a turbine runner 14a stored in a turbine cover 14 is arranged to face the pump impeller 13a, and a stator 15 is arranged between the pump impeller 13a and the turbine runner 14a. The stator 15 is arranged on a one-way clutch 16, which is on the sleeve 17 fixed by the partition wall member 2b. While the pump impeller 13a has a higher level of rotation than that of the turbine runner 14a, the one-way clutch 16 restricts the rotation of the stator 15 so as to get a torque increase effect by changing the flow of hydraulic oil. When the rotation of the pump impeller 13a and the rotation of the turbine runner 14a become substantially the same, the stator 15 rotates freely by receiving the flow of hydraulic oil, and prevents the turbine runner 14a from giving a reverse torque by the flow of the hydraulic oil. The turbine cover 14 is connected with a boss member 14b on the inner periphery. The boss member 14b is spline-engaged and also rotatably connected with the input shaft 4.

On the other hand, the lock-up clutch 20 is arranged on the front side of the turbine runner 14a in the front cover 12. The lock-up clutch 20 includes a piston member 19 having a friction plate 19a, and a damper device 18 spline-engaged with the piston member 19, and connected to the turbine cover 14. The piston member 19 is rotatably and axially freely slidably arranged on the input shaft 4 via the boss member 14b in the inner periphery, and forms an oil chamber 21 in a sealed space between the boss member 14b and the front cover 12. In addition, a top end in the outer periphery of the piston member 19 is formed into a comb-tooth shape, also formed on the outer periphery of a drive plate 18b of the damper device 18, and engaged with a spline.

The damper device 18 includes the disk-shaped drive plate 18b, two integrally connected driven plates 18a, 18c that are arranged to nip the disk-shaped drive plate 18b, and coil springs 18d, 18e that serve as a vibration-absorbing device. The coil spring 18d, 18e are stored in a long hole portion formed in the peripheral direction of the drive plate 18b and in a swollen part formed in the driven plates 18a, 18c, and absorb a rapid torque variation between both plates when compressed by relative rotation of the drive plate 18b and the driven plates 18a, 18c.

Between the damper device 18 and the piston member 19, an oil chamber 22 is formed and acted by an internal pressure in the torque converter 10, and it is structured to be able to axially press, drive and control the piston member 19 by controlling oil pressure of the oil chamber 21 and that of the oil chamber 22 via an oil passage, not shown. In short, when the piston member 19 is pressed and driven to the front side, based on a pressure difference between the oil chambers 21 and 22, the friction plate 19a engages with the front cover 12, and the piston member 19 and the front cover 12 rotate integrally, causing a lock-up state where the rotation of the front cover 12 is directly transmitted to the input shaft 4 via the damper device 18. In addition, the piston member 19, when pressed and driven to the rear side, causes a fluid transmission state where the rotation of the front cover 12 is transmitted to the input shaft 4 via the pump impeller 13a and the turbine runner 14a.

The speed change mechanism 3 is explained. The speed change mechanism 3 includes the input shaft 4 rotatably supported by the partition wall member 2b, the intermediate shaft 5 fitted with the rear end of the input shaft 4, and an output shaft 6 rotatably fitted to the rear end of the intermediate shaft 5, and rotatably supported by a sleeve unit 2d of the partition unit 2c of the case 2 that is described in detail below, and structures a single-shaft aligned center axis 3A by the input shaft 4, the intermediate shaft 5, and the output shaft 6. It should be noted that the intermediate shaft 5 in the automatic transmission 1 is structured to be spline-engaged with, and to be rotated in synchronization with the input shaft 4 (not illustrated) although separated from the input shaft 4. Therefore, the intermediate shaft 5 is a part of an input shaft in a broad sense.

In addition, on the center axis 3A, a gear mechanism 3B including planetary gears, a plurality of rotary members (for example, 31, 32) connecting the gears, and a clutch or a brake (for example, a break B-2) is arranged. The gear mechanism 3B is structured so as to shift speeds by changing a transmission path for transmission from the input shaft 4 to the output shaft 6 based on the engagement condition of the clutch or brake.

The gears and the plurality of rotary members are, in the diameter direction, rotatably supported by a bush or a needle bearing (for example, 51, 52, and 53) for the center axis 3A (the input shaft 4, the intermediate shaft 5, and the output shaft 6), and are also supported by the partition wall member 2b and the partition unit 2c for the axial direction (indicated by X1-X2) by the thrust bearing (for example, 42) interposed between the respective members.

Figure 2:
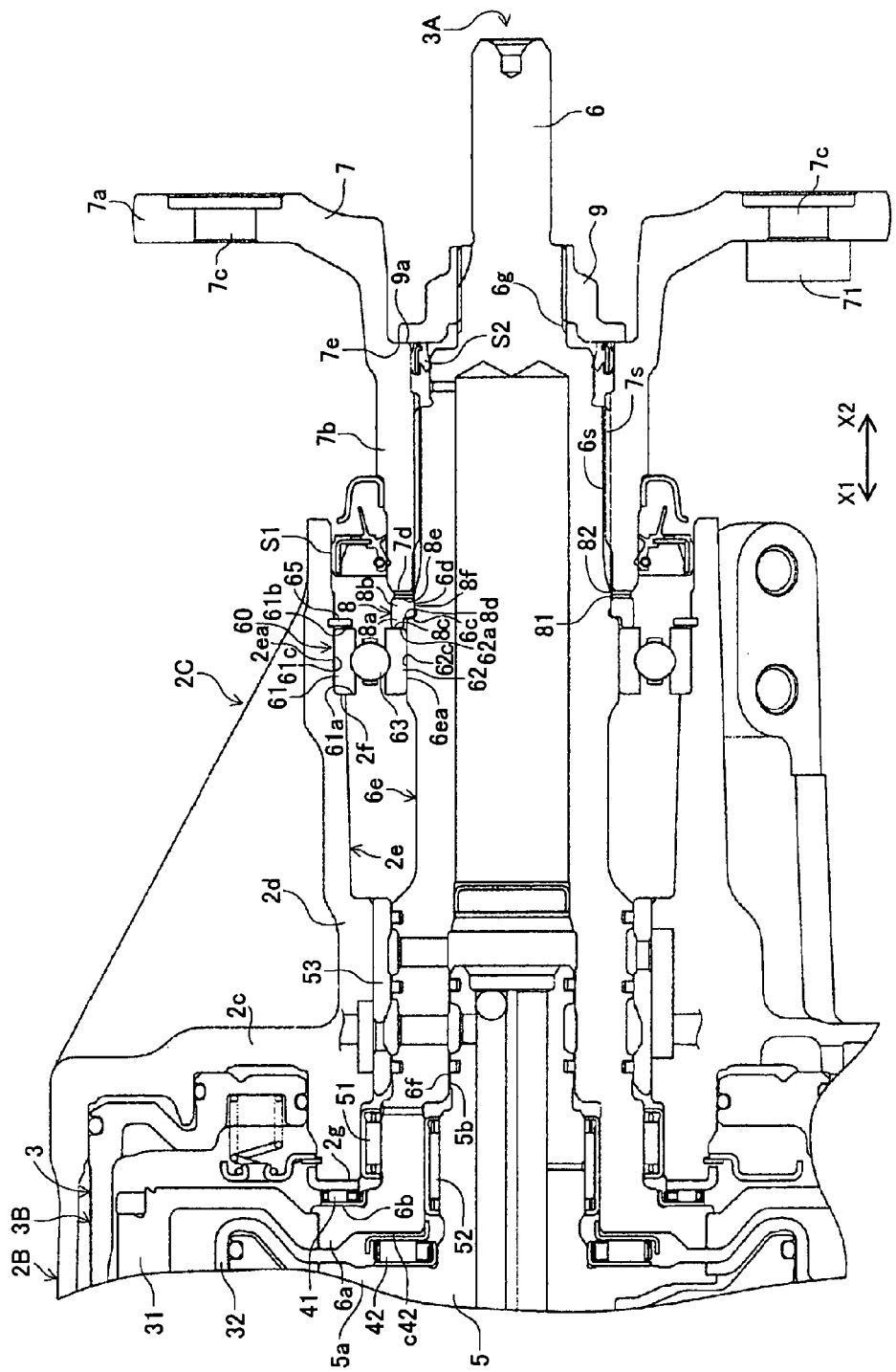
FIG. 2 is an enlarged cross section view for showing a backward part in the automatic transmission.
Figure 3:
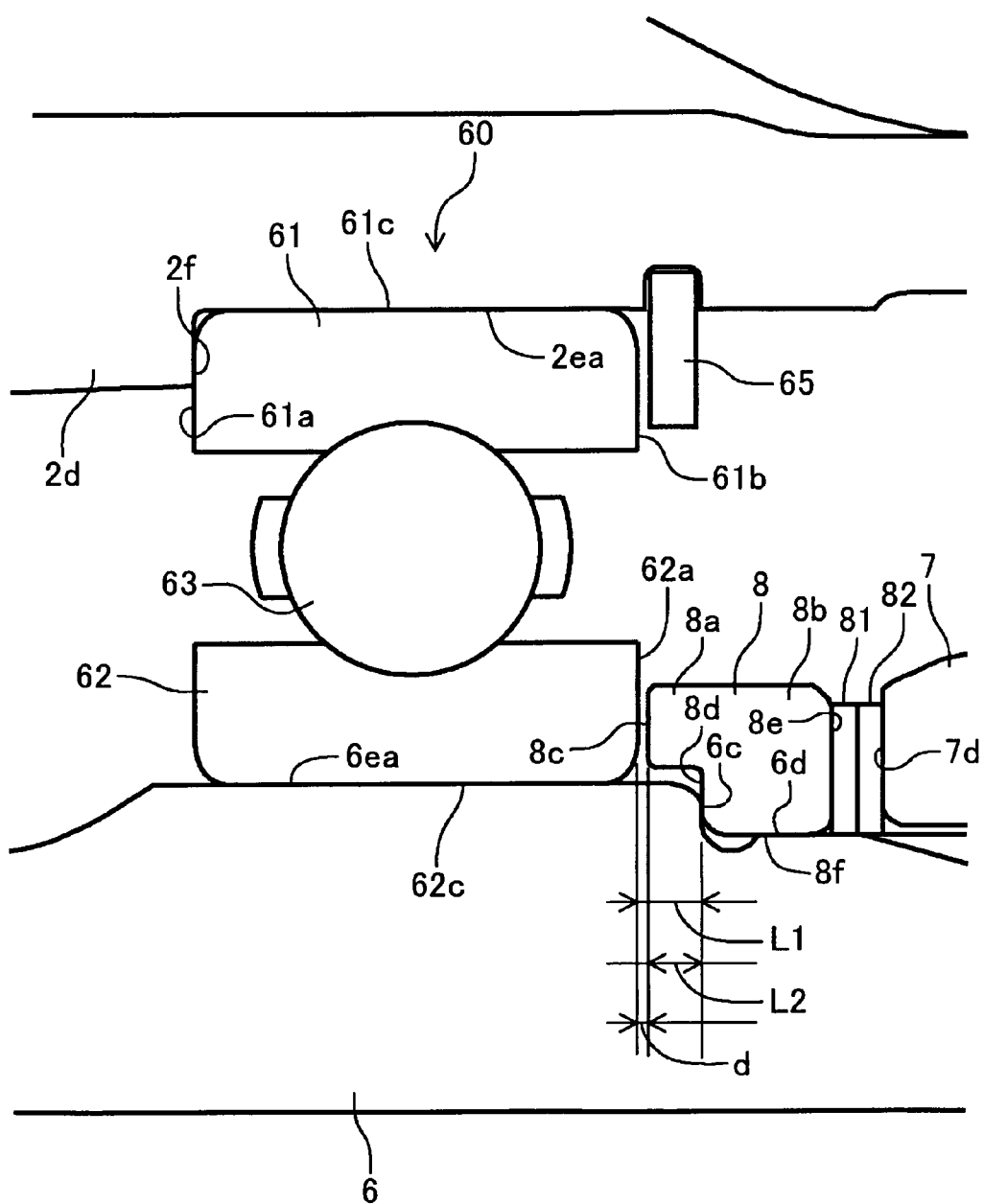
FIG. 3 is an enlarged cross section view for showing a part of a ball bearing and a shimwasher.

A supporting structure of the output shaft 6 as a main part of the present invention is explained with FIGS. 2 and 3. As shown in FIG. 2, in the case 2, a partition unit 2c formed in a substantially disk shape and partitioning the speed change mechanism 3 is arranged on a boundary part with the transmission case unit 2B and the end case unit 2C, and the sleeve unit 2d coating the outer periphery of the output shaft 6 is formed in the inner periphery of the partition unit 2c. In an inner periphery 2e of the sleeve unit 2d, a (first) step portion 2f is formed, whose rear side has larger diameter than its front side, in short, that abuts the X1 direction side (the axially input shaft side) is formed. More specifically, an outer race 61 of a ball bearing 60 described in detail below, is assembled and prevented from slipping off by a snap ring 65.

On the other hand, the output shaft 6 penetrates the sleeve unit 2*d*, and has a flange unit 6*a* that is formed in a flange shape in the front side end, and connected to one of the planetary gears, not shown, via a hub member 31. In addition, a cylindrical face 62*c* fitting an inner race 62 of the ball bearing 60 is formed in an outer periphery 6*e* of the output shaft 6, and a (second) step portion 6*c* is formed, whose rear side has a smaller diameter than its front side, in short, that abuts the X1 direction side (the axially input shaft side). The step portion 6*c* is also structured to contact a shimwasher 8 (described later). Furthermore, in the outer periphery, backward relative to the step portion 6*c*, a spline 6*s* is formed and a flange yoke 7 (described later) is structured to be able to be spline-engaged with a spline 7*s*. Then a male screw unit 6*g*, in the further backward side of the spline 6*s*, is formed to be able to threadably engage with a nut 9 fastening the flange yoke 7 for the front side.

The front part of the output shaft 6 is formed to be hollow and rotatably fitted to the outer periphery of the intermediate shaft 5 via the needle bearing 52, and to have an inner periphery 6*f* fitted to an rear end circumference side 5*b* of the intermediate shaft 5. Specifically, the intermediate shaft 5 and the output shaft 6 are fitted in the diameter direction and are loosely fitted for the axial direction (having looseness), allowing the intermediate shaft 5 to move slightly for the axial direction so as to able to allow expansion or contraction due to, for example, a temperature change and torsion at the time of the torque transmission.

In addition, in the intermediate shaft 5, the flange unit 5*a* in the flange form connected to one of the planetary gears, not shown, via the drum member 32 is formed, and the thrust bearing 42 is interposed between the flange unit 5*a* and the flange unit 6*a* of the output shaft 6. Furthermore, the needle bearing 51 and the bush 53 are interposed between the outer periphery 6*e* of the output shaft 6 and the inner periphery 2*e* of the sleeve unit 2*d*, and freely rotated, and a thrust bearing 41 is interposed between a side face 6*b* at the rear side of the flange unit 6*a* of the output shaft 6 and a side face 2*g* at the front side of the sleeve unit 2*d*.

The ball bearing 60 has a ball 63, the outer race 61 and the inner race 62 that rotatably pinch the ball, and is fitted between the inner periphery 2*e* of the sleeve unit 2*d* and the outer periphery 6*e* of the output shaft 6.

Specifically, as shown in FIG. 3, the outer race 61 is arranged so that its side face 61*a* of the front side contacts the step portion 2*f* of the sleeve unit 2*d*, and its side face 61*b* of the rear side fits on a fitting surface 2*ea* of the inner periphery 2*e* of the sleeve unit 2*d*, and further its side face 61*b* is abutted and prevented from slipping off by the snap ring 65. In addition, the cylindrical face 62*c* of the inner race 62 is fitted on a fitting surface 6*ea* of the outer periphery 6*e* of the output shaft 6.

The shimwasher (the propeller shaft connecting member) 8 is structured with a main body (contact portion) 8*b* and an extension portion 8*a* extended to the front side relative to the main body 8*b*. An inner peripheral surface 8*f* of the main body 8*b* is fitted to and supported by a spigot supporting portion 6*d* in the outer periphery 6*e* of the output shaft 6, and a side face 8*d* of the front side is assembled to contact the step portion 6*c*. In addition, the extension portion 8*a* is extended toward the inner race 62 in the outer periphery of the step portion 6*c* and is structured so that its leading end 8*c* has an empty space d that is described later with a side face 62*a* of the rear side of the inner race 62.

The flange yoke (the propeller shaft connecting member) 7 is arranged via washers 81, 82 between the rear side of the main body 8*b* of the shimwasher 8 and a side face 8*e*. The flange yoke 7, as shown in FIG. 2, has the flange unit 7*a* and the sleeve unit 7*b*, and is fastened to a propeller shaft, not shown, by a bolt 71 penetrating via a bolt hole 7*c* bored in the flange unit 7*a*. The sleeve unit 7*b* is spline-engaged with the output shaft 6 as stated above and, its side face 7*d* of the front side is abutted via the washers 81, 82 to the side face 8*e* of the shimwasher 8, and a side face 7*e* of the rear side is pressed by a side face 9*a* of the nut 9 by screwing the nut 9. In other words, the flange yoke 7 is pinched by the nut 9 for the step portion 6*c* via the shimwasher 8, and the washers 81, 82, and is axially fastened (fixed) on the output shaft 6.

In addition, a space between the outer periphery of the flange yoke 7 and the sleeve unit 2*d* is sealed by a seal ring S1 and a space between the inner periphery of the flange yoke 7 and the outer periphery of the output shaft 6 is sealed by a seal ring S2, so that automatic transmission fluid (ATF) enclosed in the case 2 is sealed.

Support of thrust force (force in the axial direction) received by the output shaft 6 is explained. For example, when thrust force toward the rear side (indicated by X2) occurs on the intermediate shaft 5 by a thrust force and the like in the planetary gear, not shown, of the gear mechanism 3B, the flange unit 5*a* of the intermediate shaft 5 is supported by the sleeve unit 2*d* of the case 2 via the thrust bearing 42, the flange unit 6*a* of the output shaft 6, and the thrust bearing 41. Accordingly, for example, even when the intermediate shaft 5 moves only by the clearance c42 of the thrust bearing 42 to the rear side, the output shaft 6 is positioned and supported on the case 2 without moving to the rear side.

In addition, when, for example, the flange yoke 7 is pulled by the propeller shaft, not shown, the output shaft 6 is also pulled to the rear side (indicated by X2) via the nut 9. Similarly, the output shaft 6 is positioned and supported on the sleeve unit 2*d* of the case 2 via the flange region 6*a* and the thrust bearing 41 without moving to the rear side.

On the other hand, when the flange yoke 7 is pressed by the propeller shaft, for example, first, the washers 82, 81 and the shimwasher 8 are pressed to the front side (indicated by X1), and then the side face 8*d* of the main body 8*b* of the shimwasher 8 presses the output shaft 6 to the front side via the step portion 6*c*. When the output shaft 6 moves to the front side at this time, the cylindrical face 62*c* of an inner race 62 of the ball bearing 60 and a fitting surface 6*ea* of the output shaft 6 slide, and the output shaft 6 slightly moves forward. Then the leading end 8*c* of the extension portion 8*a* of the shimwasher 8 abuts the side face 62*a* of the inner race 62, and receives a pressing force from the propeller shaft by the inner race 62. Because the side face 61*a* of the outer race 61 of the ball bearing 60 is supported by abutting the step portion 2*f*, the pressing force received by the inner race 62 from the propeller shaft is supported by the sleeve unit 2*d*. In other words, the output shaft 6, after moving only by the empty space d, is positioned and supported via the ball bearing 60.

By the way, in the speed change mechanism 3, the thrust bearings (including the thrust bearing 42) are arranged among respective rotary members including the hub member 31 and the drum member 32 in the axial direction, and have a gap for the total clearance of the thrust bearings (including the clearance c42 of the thrust bearing 42). The gap for the axial direction in the speed change mechanism 3, for example, in the automatic transmission, is about 0.48-1.2 mm with the addition of the product size deviations. Therefore, when the empty space d between the inner race 62 of the ball bearing 60 and the extension portion 8*a* of the shimwasher 8, is set to, for example, about 0.05-0.2 mm, even if the output shaft 6 moves by that amount, the movement does not give any effect on the torque converter 10 and, in particular, the lock-up clutch 20.

Therefore, across the automatic transmission, first, the output shaft 6 is installed to the sleeve unit 2*d* of the case 2 with the thrust bearing 41, the needle bearing 51, the bush 53 and the like interposed in between, and the ball bearing 60 is assembled and prevented from falling off by the snap ring 65 from the rear side. Afterwards, as shown in FIG. 3, the distance L1 between the side face 62*a* of the inner race 62 and the step portion 6*c* is measured. In this way, the measurement in an assembled state makes it possible to measure the correct distance L1 including the production size deviations in the ball bearing 60, the sleeve unit 2*d* (in particular, the step portion 2*f*), the output shaft 6 (in particular, the step portion 6*c*) and the like.

On the other hand, a plurality of shimwashers 8 whose extension portions 8*a* are different in length are prepared. Then, a shimwasher 8 is selected that has the length L1 obtained by subtracting the empty space d from the distance L1 measured above, as the length of the extension portion 8*a*, and the selected shimwasher 8 is assembled for the step portion 6*c* of the output shaft 6 and the spigot supporting portion 6*d*. With the washers 81, 82 interposed, the flange yoke 7 is spline-engaged with the output shaft 6 and fastened by the nut 9, so that the shimwasher 8 and the flange yoke 7 are fixed on the output shaft 6. When, for example, the extension portion 8*a* and the main body 8*b* of the shimwasher 8 are formed separately at this time, there is a possibility that the extension portion 8*a* is erroneously assembled between the step portion 6*c* and the main body 8*b*. Erroneous assembly does not occur, however, because the extension portion 8*a* and the main body 8*b* are integrally formed.

In addition, for example, in the case of an automatic transmission in which the case is separately formed as a transmission case and an extension case, after providing a part for arranging a thrust bearing between a partition wall member of the transmission case and an output shaft, measuring an arranged position of the thrust bearing including product size deviations and accurately assembling the thrust bearing by selecting a washer and the like, it is possible to assemble the extension case where the ball bearing is disposed. However, in the case of the automatic transmission 1 in which the case 2 is an integral one, measurement can be performed from the outside of the case 2 after assembling the ball bearing 60, and shimwasher 8 can be assembled without detaching the ball bearing 60. This is more effective to prevent an increase in the production process.

As described, according to the present invention, the thrust bearing 41 is interposed between the flange unit 6*a* of the output shaft 6 and the side face 2*g* at the axially input shaft side (indicated by X1) of the sleeve unit 2*d* of the case 2, and the ball bearing 60 is interposed between the inner periphery 2*e* of the sleeve unit 2*d* and the outer periphery 6*e* of the output shaft 6 so that the side face 61*a* of the outer race 61 contacts the step portion 2*f*. Further, the flange yoke 7 connectable to the propeller shaft is spline-engaged with the outer periphery of the output shaft 6, and, upon being pressed in the axially input shaft side by the propeller shaft, the flange yoke 7 contacts the side face 62*a* of the inner race 62 of the ball bearing 60 via the shimwasher 8. Thus, when a tensile force occurs on the output shaft 6 from the propeller shaft via the flange yoke 7 or when a thrust force of the gear mechanism 3B is given, the thrust bearing 62 can receive such force. Further, when a pressing force occurs from the propeller shaft via the flange yoke 7 and the shimwasher 8, the ball bearing 60 can receive the force. In other words, the force generated on the ball bearing 60 is changed to only the force to be applied to the axially input shaft side. This makes it possible to improve durability and compactness of the ball bearing 60, while preventing the lock-up clutch 20 from being affected by the expansion and contraction of the propeller shaft.

In addition, after the ball bearing 60 is assembled, it is possible to measure, from the outside of case 2, the accurate size (that is, distance L1) including the product size deviations for the ball bearing 60, and to use the shape of the shimwasher 8 according to the size. This facilitates the measurement, while preventing an increase in the production process.

In addition, the flange yoke 7 and the shimwasher 8 are fastened at the axially input shaft side via the main body 8*b* of the shimwasher 8 for the step portion 6*c* by the nut 9, and when the extension portion 8*a* is pressed axially toward the input shaft by the propeller shaft, it connects the side face 62*a* of the inner race 62 of the ball bearing 60. Thus, the flange yoke 7 can be fixed on the output shaft 6, and the ball bearing 60 can receive the force upon being pressed by the propeller shaft.

Furthermore, the extension portion 8*a* of the shimwasher 8, when not pressed axially toward the input shaft by the propeller shaft, shares with the side face 62*a* of the inner race 62 of the ball bearing 60 the empty space d which is smaller than a clearance in the axial direction possessed in the speed change mechanism 3. This prevents, when not pressed by the propeller shaft, the ball bearing 60 from being a single-side contact. Further, upon being pressed by the propeller shaft, the output shaft 6 moves to the extent of the empty space d so that the pressing force is received by the ball bearing 60, while the movement of the output shaft 6 is absorbed in the speed change mechanism 3. This prevents the lock-up clutch 20 from being affected by the pressure applied by the propeller shaft.

Further, the clearance in the axial direction, for the speed change mechanism 3, is the sum total of clearances between the rotary members in the gear mechanism 3B and the thrust bearings.

Further, the extension portion 8*a* of the shimwasher 8 is provided with a length so as to form the empty space d according to the distance between the side face 62*a* of the inner race 62 of the ball bearing 60 and the step portion 6*c*. Thus, only by precisely adjusting the length L2 of the extension portion 8*a* from the side face 6*c* of the main body 8*b* of the shimwasher 8 to the measured distance L1 between the side face 62*a* of the inner race 62 and the step portion 6*c*, the empty space d can be formed, eliminating the need to form the flange yoke 7 with high accuracy. When the extension portion 8*a* and the main body 8*b* are formed separately, for example, there is a possibility for the extension portion 8*a* to be assembled erroneously between the step portion 6*c* and the main body 8*b*. However, such an erroneous assembly can be prevented because the main body 8*b* and the extension portion 8*a* of the shimwasher 8 are integrally formed.

Furthermore, from among a plurality of shimwashers having the extension portion 8*a* of a different length, the shimwasher 8 is selected and applied that has the length L2 equal to the length of the extension 8*a* to form the empty space d. This eliminates the need to process the shimwasher 8 for each product individually, enabling the empty space d to be formed with high accuracy.

In particular, the case 2 is integrally formed with the transmission case unit 2B including the speed change mechanism 3 and the sleeve unit 2*d*. For example, measurement including the product size deviations inside the case 2 for the ball bearing 60 is not easy and also assembling parts (a washer and the like) with high accuracy according to the measurement causes an increase in production process. In the automatic transmission 1, however, measurements, including the product size deviations outside of the case 2 for the ball bearing 60 can easily be performed, and an increase in production process such as detaching and reassembling the ball bearing 60 can be prevented.

In the present embodiment according to the present invention, as the propeller shaft connecting members, the shimwasher 8 and the flange yoke 7 are separately formed, so that only the shimwasher 8 can be selectively used. However, the present invention is not limited to this. Even integrally forming the shimwasher 8 and the flange yoke 7, and selecting the integral part having the length L2 corresponding to the extension portion 8a, or processing the integral part so as to have the length L2 fall within the scope of technical idea of the present invention that a measurement of the distance L1 is facilitated and a process to detach the ball bearing 60 is removed.

Further, although the embodiment describes a multi-stage automatic transmission, the automatic transmission according to the present invention is not limited to this, and the present invention may be applied to a continuously variable automatic transmission such as a belt type or a toroidal type.

An automatic transmission according to the present invention can be used for an automatic transmission mounted to a car, a truck, a bus, a farm machine, and the like, in particular, preferably used for those which have an output shaft connected to a propeller shaft, and a torque converter with a lock-up clutch, and which require improvement in more compactness and higher durability.

According to an exemplary aspect of the invention, a thrust bearing is interposed between the flange unit and the side face of the sleeve unit at the axially input shaft side, the ball bearing is interposed between the inner periphery of the sleeve unit and the outer periphery of the output shaft so that the side face of the outer race of the ball bearing to be contacted with the first step portion toward the axially input shaft side, the propeller shaft connecting members can be connected with the propeller shaft, and spline-engaged with the outer periphery of the output shaft, and the propeller shaft connecting members contact the side face of the inner race of the ball bearing upon being pressed axially toward the input shaft by the propeller shaft. Thus, when a tensile force occurs on the output shaft from the propeller shaft via the propeller shaft connecting members or when a thrust force from the gear mechanism is received, the thrust bearing can receive such a force. Further, when pressing force occurs from the propeller shaft via the propeller shaft connecting members, the ball bearing can receive such force. In other words, the force occurring on the ball bearing is made only to the force acting axially toward the input shaft. This not only improves durability and compactness of the ball bearing, but also prevents the lock-up clutch from getting affected by expansion and contraction of the propeller shaft.

Further, after the ball bearing is assembled, a precise size including the product size deviations can be measured from outside the case of the ball bearing, and the shape of the propeller shaft connecting members according to the size can be optimized. As a result, the measurement can be made easier and also an increase in production process is prevented.

According to an exemplary aspect of the invention, the propeller shaft connecting members are fastened, toward the axially input shaft side, to the second step portion via the contact portion by the fastening member, and the extension portion contacts the side face of the inner race of the ball bearing upon being pressed axially toward the input shaft by the propeller shaft. Accordingly, the propeller shaft connecting members can be fixed on the output shaft, and also the ball bearing can receive a pressing force upon being pressed by the propeller shaft.

According to an exemplary aspect of the invention, the extension portion, when not pressed axially toward the input shaft by the propeller shaft, shares with the side face of the inner race of the ball bearing an empty space which is smaller than a clearance in the axial direction possessed in the speed change mechanism. This prevents the ball bearing from a single-side contact when not pressed by the propeller shaft. Further, upon being pressed by the propeller shaft, the output shaft moves to the extent of the empty space, so that the ball bearing can receive the pressing force. The movement of the output shaft is absorbed in the speed change mechanism, preventing the lock-up clutch from being affected by pressure applied by the propeller shaft.

According to an exemplary aspect of the invention, the clearance in the axial direction, which the speed change mechanism has, can be determined by the sum total of the clearances between the plurality of rotary members in the gear mechanism and the plurality of thrust bearings.

According to an exemplary aspect of the invention, the propeller shaft connecting members include the shimwasher integrally formed with the contact portion and the extension portion, and the flange yoke having the flange unit connected with the propeller shaft and the boss unit spline-engaged with the output shaft. Then, the extension portion of the shimwasher is provided with a length so as to form the empty space according to the distance measured between the side face of the inner race of the ball bearing and the second step portion. Thus, only by precisely adjusting the length of the extension unit from the contact portion of the shimwasher to the measured distance between the side face of the inner race and the second step portion, the empty space can be formed, eliminating the need to form the flange yoke with high accuracy. When the extension portion and the contact portion are formed separately, for example, there is a possibility for the extension portion to be assembled erroneously between the second step portion and the contact portion. However, such an erroneous assembly is prevented because the contact portion and the extension portion of the shimwasher are integrally formed.

According to an exemplary aspect of the invention, from among those having the different length, the shimwasher is selected and applied that has a length equal to the length of the extension portion to form the empty space. This eliminates the need to process the shimwasher for each product individually, enabling to form the empty space with high accuracy.

According to an exemplary aspect of the invention, the case is integrally formed with the transmission case unit including the speed change mechanism, and the sleeve unit. For example, measurement including the product size deviations inside of the case for the ball bearing is not easy, and also assembling parts (a washer and the like) with high accuracy according to the measurement causes an increase in production process. In the present invention, however, measurement including the product size deviations outside the case for the ball bearing can easily be performed, and an increase in production process such as detaching and reassembling the ball bearing is prevented.

The invention claimed is:

1. An automatic transmission comprising:
    a case;
    a speed change mechanism including an input shaft and an output shaft, the input shaft and the output shaft being rotatably supported by the case and forming a single-shaft aligned along a center axis, with the speed change mechanism also including a gear mechanism on the center axis;

a torque converter having a lock-up clutch axially arranged and freely slidably toward and away from the input shaft, wherein:

the case includes a sleeve unit at an outer periphery of the output shaft, the output shaft includes a flange unit arranged opposite a side face of the sleeve unit on an input shaft side, and the sleeve unit has a first step portion at an inner periphery thereof;

a thrust bearing interposed between the flange unit and the side face of the sleeve unit on the input shaft side;

a ball bearing that includes an outer race, a side face of which contacts the first step portion toward the input shaft side, with the ball bearing interposed between the inner periphery of the sleeve unit and the outer periphery of the output shaft; and a propeller shaft connecting member capable of connecting with a propeller shaft, spline-engaging with the outer periphery of the output shaft, and contacting a side face of an inner race of the ball bearing upon being pressed axially toward the input shaft side by the propeller shaft.

2. The automatic transmission according to claim 1, wherein:

the output shaft has a second step portion provided opposite the input shaft side relative to the ball bearing on the outer periphery of the output shaft, and abutting toward the input shaft side;

the propeller shaft connecting member has a contact portion contacting the second step portion, and an extension portion extending toward an outer periphery of the second step portion;

the output shaft further includes a fastening member that fastens the propeller shaft connecting member, toward the input shaft side, to the second step portion via the contact portion; and the extension portion contacts the side face of the inner race of the ball bearing upon being pressed axially toward the input shaft side by the propeller shaft.

3. The automatic transmission according to claim 2, wherein the extension portion, when not pressed axially toward the input shaft side by the propeller shaft, shares with the side face of the inner race of the ball bearing, an empty space that is smaller than a clearance in the axial direction possessed in the speed change mechanism.

4. The automatic transmission according to claim 3, wherein:

in the speed change mechanism, the input shaft and the output shaft are loosely fitted in the axial direction, and a plurality of rotary members in the gear mechanism are rotatably supported by a plurality of thrust bearings in the axial direction, and the clearance in the axial direction possessed in the speed change mechanism is the sum total of clearances between the rotary members in the gear mechanism and the thrust bearings.

5. The automatic transmission according to claim 3, wherein:

the propeller shaft connecting member includes a shimwasher integrally formed with the contact portion and the extension portion, and a flange yoke having a flange unit connected with the propeller shaft and a boss unit which is spline-engaged with the output shaft, and the extension portion of the shimwasher is provided with a length so as to form the empty space according to a distance between the side face of the inner race of the ball bearing and the second step portion.

6. The automatic transmission according to claim 5, wherein, from among a plurality of shimwashers having the extension portion of a different length, the shimwasher is selected and applied that has a length equal to the length of the extension portion.

7. The automatic transmission according to claim 3, wherein the case is integrally formed with a transmission case unit encasing the speed change mechanism, and the sleeve unit.

8. The automatic transmission according to claim 4, wherein:

the propeller shaft connecting member includes a shimwasher integrally formed with the contact portion and the extension portion, and a flange yoke having a flange unit connected with the propeller shaft and a boss unit which is spline-engaged with the output shaft, and the extension portion of the shimwasher is provided with a length so as to form the empty space according to a distance between the side face of the inner race of the ball bearing and the second step portion.

9. The automatic transmission according to claim 8, wherein, from among a plurality of shimwashers having the extension portion of a different length, the shimwasher is selected and applied that has a length equal to the length of the extension portion.

10. The automatic transmission according to claim 4, wherein the case is integrally formed with a transmission case unit encasing the speed change mechanism, and the sleeve unit.

11. The automatic transmission according to claim 5, wherein the case is integrally formed with a transmission case unit encasing the speed change mechanism, and the sleeve unit.

12. The automatic transmission according to claim 6, wherein the case is integrally formed with a transmission case unit encasing the speed change mechanism, and the sleeve unit.

13. The automatic transmission according to claim 8, wherein the case is integrally formed with a transmission case unit encasing the speed change mechanism, and the sleeve unit.

14. The automatic transmission according to claim 9, wherein the case is integrally formed with a transmission case unit encasing the speed change mechanism, and the sleeve unit.

* * * * *